United States Patent
Kumar et al.

(10) Patent No.: US 10,402,332 B2
(45) Date of Patent: Sep. 3, 2019

(54) MEMORY PRE-FETCH FOR VIRTUAL MEMORY

(71) Applicant: Xilinx, Inc., San Jose, CA (US)

(72) Inventors: Bhaarath Kumar, Fremont, CA (US); Sarosh I. Azad, Fremont, CA (US)

(73) Assignee: XILINX, INC., San Jose, CA (US)

( * ) Notice: Subject to any disclaimer, the term of this patent is extended or adjusted under 35 U.S.C. 154(b) by 464 days.

(21) Appl. No.: 15/163,384

(22) Filed: May 24, 2016

(65) Prior Publication Data

US 2017/0344482 A1 Nov. 30, 2017

(51) Int. Cl.
*G06F 12/0862* (2016.01)
*G06F 12/1027* (2016.01)
*G06F 12/1009* (2016.01)
*G06F 13/28* (2006.01)

(52) U.S. Cl.
CPC ...... *G06F 12/0862* (2013.01); *G06F 12/1009* (2013.01); *G06F 12/1027* (2013.01); *G06F 13/28* (2013.01); *G06F 2212/6026* (2013.01); *G06F 2212/65* (2013.01); *G06F 2212/68* (2013.01)

(58) Field of Classification Search
CPC .................................................. G06F 12/0862
See application file for complete search history.

(56) References Cited

U.S. PATENT DOCUMENTS

| | | | |
|---|---|---|---|
| 9,792,215 B2 * | 10/2017 | Podaima | G06F 12/0862 |
| 2012/0079202 A1 | 3/2012 | Chirca | |
| 2013/0179638 A1 | 7/2013 | Bratt et al. | |
| 2013/0227245 A1 | 8/2013 | Gupta et al. | |
| 2015/0082000 A1 | 3/2015 | Hong et al. | |
| 2015/0311899 A1 | 10/2015 | Karras et al. | |
| 2016/0048454 A1 | 2/2016 | Ahmad | |
| 2016/0350225 A1 * | 12/2016 | Podaima | G06F 12/0862 |

* cited by examiner

*Primary Examiner* — Ryan Bertram
*Assistant Examiner* — Edmund H Kwong
(74) *Attorney, Agent, or Firm* — LeRoy D. Maunu

(57) ABSTRACT

Virtual memory pre-fetch requests are generated for a virtual memory and a multiple port memory management unit (MMU) circuit. Virtual memory access requests sent to a particular port of the MMU circuit are monitored. In response to the satisfaction of a trigger condition, virtual memory pre-fetch requests are generated and transmitted to the MMU circuit using the particular port. Physical access requests from the MMU circuit are monitored for physical addresses corresponding to the virtual memory pre-fetch requests. The physical access requests corresponding to the virtual memory pre-fetch requests are filtered.

20 Claims, 5 Drawing Sheets

MEMORY PRE-FETCH FOR VIRTUAL MEMORY

TECHNICAL FIELD

The disclosure generally relates to memory pre-fetching, and more particularly to memory pre-fetching to populate a cache for virtual memory translation.

BACKGROUND

There are a variety of different applications that can use memory circuits including, but not limited to, programmable integrated circuits, programmable logic devices (PLDs), and System on Chip (SoC) devices. Some SoC devices can include programmable logic that is similar to programmable logic provided by various PLDs. PLDs are a type of programmable integrated circuit (IC) that can be programmed to perform specified logic functions. One type of PLD, the field programmable gate array (FPGA), can include an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect (PCI), PCI Express (PCIe) and Ethernet, and so forth. Some devices include enough components and functionality to effectively serve as an entire computer system on a single IC chip. Devices with such functionality are sometimes referred to as SoCs.

SoCs are one type of application in which multiple masters may share a common physical memory and I/O. One way in which the masters can share memory is through the use of virtual memory. Each master can operate within its own virtual address space that is mapped to the physical address space. A memory management unit (MMU) circuit can be configured to translate virtual addresses into physical addresses. The translation can be a significant bottleneck to efficiency.

These and other problems can be problematic for IC design and their uses.

SUMMARY

A number of implementations are directed toward memory pre-fetching to populate a cache for virtual memory translation. The pre-fetching can be distributed between multiple pre-fetch generating circuits that each correspond to a different port of an MMU circuit.

Particular implementations are directed toward a method for generating virtual memory pre-fetch requests for a virtual memory and a multiple port memory management unit (MMU) circuit. A TLB pre-fetch circuit monitors virtual memory access requests sent to a particular port of the MMU circuit and, detects satisfaction of at least one trigger condition that is based upon the virtual memory access requests. The TLB pre-fetch circuit generates, in response to the satisfaction of the at least one trigger condition, virtual memory pre-fetch requests. The virtual memory pre-fetch requests are transmitted to the MMU circuit using the particular port. Physical access requests from the MMU circuit are monitored for physical addresses corresponding to the virtual memory pre-fetch requests. The physical access requests that correspond to the virtual memory pre-fetch requests are filtered.

Certain implementations are directed toward a system that includes an MMU circuit. The MMU circuit includes multiple ports, where each port is configured to translate virtual memory addresses to physical memory addresses using a respective translation lookaside buffer (TLB). The system includes at least one TLB pre-fetch circuit that, for a particular port of the multiple ports, is configured to: monitor virtual memory access requests sent to the particular port of the MMU circuit; detect, for the virtual memory access requests, satisfaction of at least one trigger condition; generate, in response to the satisfaction of the at least one trigger condition, virtual memory pre-fetch requests; and transmit the virtual memory pre-fetch requests to the MMU circuit using the particular port. The system includes at least one TLB pre-fetch filter circuit that is configured to: monitor physical address requests from the MMU circuit for physical addresses corresponding to the virtual memory pre-fetch requests; and filter the physical addresses corresponding to the virtual memory pre-fetch requests.

Other features will be recognized from consideration of the Detailed Description and Claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

Figure 1:
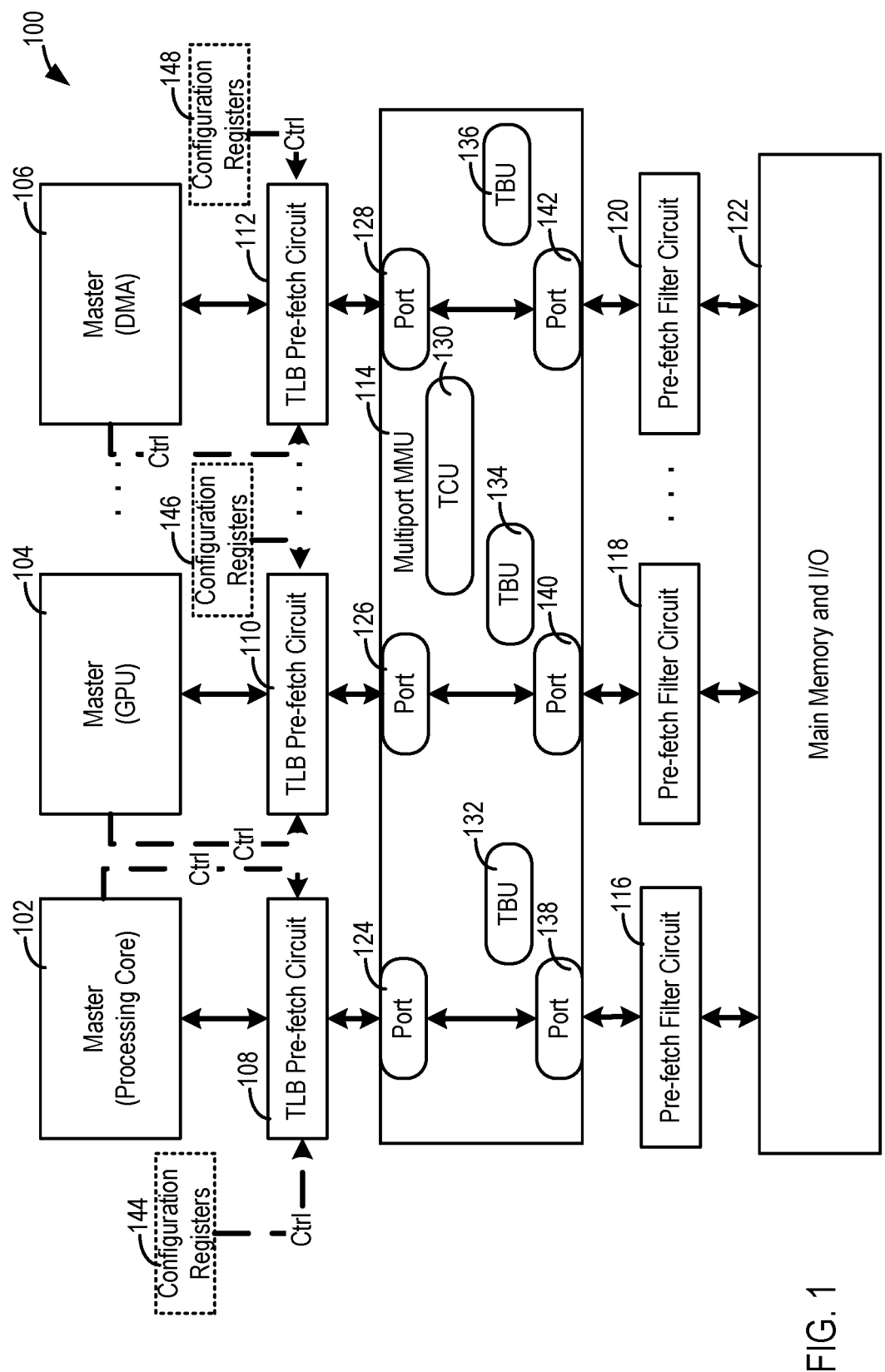
FIG. 1 is a block diagram of a system for generating virtual memory pre-fetch requests for a multiple port MMU, consistent with various implementations of the present disclosure.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Various implementations are directed toward improving virtual memory address translation through the use of pre-fetch operations to populate Translation Look-aside Buffers (TLBs). For instance, virtual memory pre-fetch requests are generated by a plurality of pre-fetch circuits, each of which corresponds to a source of the virtual memory pre-fetch requests. Each of the pre-fetch circuits is configured to generate pre-fetch requests that result in populating a respective TLB. In this manner, the different TLBs are populated relatively independently from one another and in a proactive manner.

Certain implementations include a plurality of pre-fetch circuits that include customizable options that control how pre-fetch operations are generated and processed. The customizable options can allow for each pre-fetch circuit to be configured differently relative to their respective virtual memory spaces and virtual memory address generation circuit. For example, each pre-fetch circuit could be configured to issue memory pre-fetch requests that request data blocks from a virtual address range that corresponds to a page size of their respective virtual memory space. As each virtual memory address generation circuit (e.g., each central processing unit (CPU) or graphics processing unit (GPU)) might have a different page size, the use of dedicated pre-fetch circuits with customizable options may improve the efficiency of the pre-fetch operations. Various examples of customizable options are discussed in more detail herein.

Relative to a process running within an operating system, the virtual memory space can appear to be large, contiguous sections of memory, while the actual, physically location for the data can be dispersed across different areas of a physical memory circuit that provides the main memory. A processing circuit configured to provide virtual memory space can generate requests for access to data using virtual memory addresses without having to deal with the actual location of the data within main memory. Instead, an MMU circuit (or "MMU" for brevity) can handle the conversion to a physical address based upon mappings stored in a page table, with each addressable mapping being referred to as a page table entry.

According to various implementations, address translation between virtual and physical (main) memory spaces are performed by an MMU. The page table can be stored in the main memory, which the MMU can access to obtain the physical address for a virtual memory access request. This process is sometimes referred to as a page walk. The page walk can require multiple accesses to the page table, stored in physical/main memory, in order to compute the physical address. The obtained physical address is then used as part of yet another main memory access that retrieves the data corresponding to the original virtual memory access request. Thus, a virtual memory access can result in many accesses to the main memory, and therefore be many times slower than a single, direct access to main memory. Accordingly, a local cache circuit can store frequent page translations so that main memory access can be avoided. This type of cache circuit is sometimes referred to as a Translation Look-aside Buffer (TLB). The MMU can first check the TLB contents to find a match for a virtual memory access. If the cache contains a matching entry (a TLB "hit"), the appropriate physical address information is used to compute the physical address. The MMU can then issue a main memory access request using the physical address. If the cache does not contain a matching entry (a TLB "miss"), the MMU can access the page table to retrieve the desired physical address, resulting in the aforementioned page walk delays.

According to various implementations, an MMU can have multiple ports for multiple different sources of virtual memory access requests. These sources are referred to herein as either virtual memory address generation circuits or masters. Each port can have a different TLB and corresponding control circuitry. The TLB and control circuit are collectively referred to as a Translation Look-aside Buffer unit (TBU). A single Translation Control Unit (TCU) circuit can manage address translations for all of the TBUs. Various implementations are directed toward the generation and handling of virtual memory access request for the purpose of populating TLBs with entries in order to reduce TLB misses. These virtual memory access requests are not generated by a master and are instead generated by a virtual memory pre-fetch circuit (which can temporarily act as a master) in anticipation of what a master might request in the future. The generated virtual memory access requests are therefore referred to as virtual memory pre-fetch requests. More particular aspects allow for the virtual memory pre-fetch circuits to be individually tailored for each port of the MMU.

Memory accesses in many systems are latency prone and unpredictable. Many applications like video or Direct Memory Access (DMA) can have both bandwidth and fixed latency requirements relating to large amounts of read/write data. Moving large amounts of data in a virtual system involves many MMU page translations to be performed, which can consume many clock cycles. MMU page table caching in TLBs can play a vital role in mitigating the translation overhead. Example page table sizes can vary between 4 KB, 16 KB or 64 KB. The page table translation occurs once for each page, with an offset being used to index within each page. Assuming that a system uses the 4 KB page size granularity, an MMU would be performing page table translation once for every new 4 KB of address space accessed. As stated earlier, page table walks can be prohibitively time consuming and can use limited memory resources.

Various implementations are directed toward a configurable pre-fetching approach that provides efficient data movement in memory systems of IC chips, which can be configured as SoCs or as other processing systems. MMUs in many SoC have very limited pre-fetching capabilities, e.g., due to limitations on the available resources and the uncertainty in how the SoC will ultimately be used by the end users. Various implementations provide the flexibility to configure or program how pre-fetch operations are handled. Examples include configuring the number of pre-fetch requests needed to be performed as well as mitigating the overhead for the pre-fetch requests by limiting the number of main memory accesses made in support of the pre-fetch requests.

Some implementations also take into consideration the efficiency of the memory system by implementing the pre-fetch generation upstream from the MMU and its TBUs. Placing the control over the pre-fetch generation much closer to the source of the virtual memory access requests can allow for more individualized control (e.g. on a port-by-port basis) relative to an approach in which pre-fetch requests are centrally generated (e.g., using a TCU, which deals with transactions from multiple TBUs and associated ports).

Turning now to the figures, FIG. 1 depicts a block diagram of a system for generating virtual memory pre-fetch requests for a multiple port MMU, consistent with various implementations of the present disclosure. The depicted components of the system reside on an IC chip 100, which includes multiple masters 102, 104, and 106 that generate virtual memory access requests for a corresponding input port 124, 126, and 128 and a corresponding output port 138, 140, and 142. The masters include one or more of processing circuits, where each processing circuit provides one or more functions for the system. A few non-limiting examples of such circuits include CPUs or processing cores, GPUs, and circuits configured to operate using DMA.

A multiport MMU 114 is configured to receive virtual memory access requests from the masters on corresponding ports. The ports have different TBUs 132, 134, and 136, where each TBU corresponds to a different virtual memory space of the associated master. TCU 130 controls and manages the address translations for each of the ports and their corresponding TBUs. This includes managing the TBUs, and their respective TLB circuits, to determine whether there is a TLB hit or TLB miss. The TCU 130 also controls the address translation and then generates corresponding accesses to main memory 122.

TLB pre-fetch circuits 108, 110, and 112 are configured to generate virtual memory pre-fetch requests for their respective ports, thereby decoupling the pre-fetch generation of the ports from one another. In particular implementations, the TLB pre-fetch circuits 108, 110, and 112 are designed to allow the masters 102, 104, and 106 to adjust parameters that are used to determine when and how to generate the pre-fetch requests. This adjustment capability is represented by the control (Ctrl) arrow. For example, one or more sets of configuration registers 144, 146, and 148 can be provided in order to customize each of the circuits. The configuration registers can be accessed by the depicted masters 102, 104, and 106, or by other master that has sufficient privileges. The contents of the configuration registers are accessible by TLB pre-fetch circuits, which are configured according to the values stored within the registers. In some implementations, the masters directly access the TLB pre-fetch circuits in order to send data specifying the configuration settings.

The TLB pre-fetch circuits may be implemented in programmable logic and the end user can set one or more of the parameters in the design files. The manner in which the parameters can be set and adjusted is not limited to these examples, and various combinations of different solutions can be used. The decoupling and configurability can each be particularly useful for populating the TBUs in a manner that is tailored toward the different characteristics of each of respective masters. Examples of these characteristics include the configuration of the virtual memory space (e.g., page size), and the expected memory access profile (e.g., the frequency and size of data accesses).

According to some implementations, TLB pre-fetch filter circuits 116, 118, and 120 are included to filter out accesses to main memory 122. In particular, the filter circuits are configured to filter out physical access requests that were generated from pre-fetch requests. For example, pre-fetch circuit 108 may generate a pre-fetch request for a virtual memory address X. The MMU 114 and TCU 130 then determine that the TBU 132 does not contain an entry for virtual memory address X. In response, the TCU 130 performs a page walk by accessing the page table stored in main memory 122. The pre-fetch filter circuit 116 monitors the physical access requests to the main memory and allows the access requests to the page table to reach main memory. Once the TCU 130 completes the page walk, the TLB in TBU 132 is updated by storing a translation entry corresponding to the virtual memory address X and the corresponding physical memory address Y. The MMU 114 then attempts to complete the pre-fetch for a virtual memory address X by sending a physical memory access request for physical address Y. Pre-fetch filter circuit 116 identifies the physical memory access request for address Y as corresponding to the initial pre-fetch for a virtual memory address X and prevent (filter) the request from reaching the main memory 122. According to certain implementations, the pre-fetch filter circuit 116 is also configured to generate a transaction completion notification to TLB pre-fetch circuit 108. The notification can indicate that the pre-fetch request is completed and no longer outstanding.

The filter capabilities of the pre-fetch filter circuit 116 can be particularly useful for offloading the processing and decision making from the MMU 114. In specific implementations, the MMU 114 functionality can be indistinguishable from an MMU 114 that is used in a system that does not include the TLB pre-fetch circuits or TLB pre-fetch filter circuits.

Figure 2:
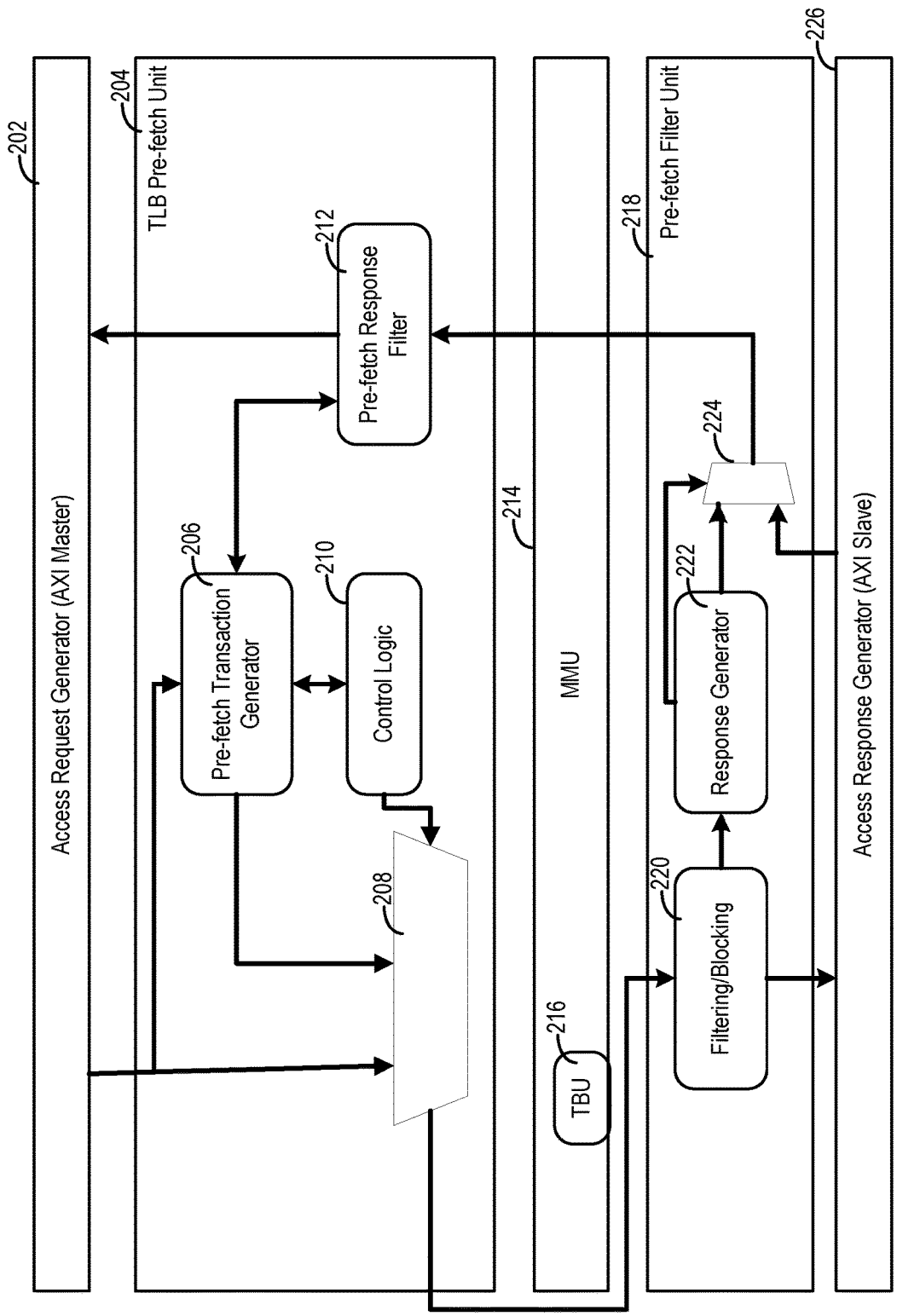
FIG. 2 is a block diagram that shows particular aspects of TLB pre-fetch circuits and TLB pre-fetch filter circuits, consistent with implementations of the present disclosure.

FIG. 2 is a block diagram that shows particular aspects of TLB pre-fetch circuits and TLB pre-fetch filter circuits, consistent with implementations of the present disclosure. FIG. 2 shows a single TLB pre-fetch circuit 204, however, additional TLB pre-fetch circuits can be included for additional ports of the MMU 214 (e.g., as shown in FIG. 1). Although not limited thereto, the description of the various components of FIG. 2 is generally consistent with similar components discussed in FIG. 1 and elsewhere in the present disclosure. An access request generator 202 operates in a virtual memory space that is mapped to a physical memory space provided by the access response generator 226. In certain embodiments, the system of FIG. 2 is part of a SoC that uses a master-slave interconnection solution, such as AMBA (Advanced Microcontroller Bus Architecture) eXtensible Interface (AXI) interconnection/bus. Other interconnection and bus solutions are also possible.

According to particular implementations, the TLB pre-fetch circuit 204 is configured to monitor virtual memory access requests sent to a particular port of the MMU 214. For instance, a pre-fetch transaction generator module 206 can be connected to the address request bus. The pre-fetch transaction generator module 206 identifies and tracks the addresses for the virtual memory access requests appearing on the address request bus. The pre-fetch transaction generator module 206 can then determine whether or not a trigger condition has been satisfied. In particular implementations, the trigger condition(s) for the pre-fetch transaction generator module 206 is set based upon one or more configurable parameters. For example, the pre-fetch transaction generator module 206 may be configured with a trigger condition that compares the virtual memory address to the current contents of the TLB. A particular trigger condition could be based upon whether or not the TLB contains entries sufficient to cover a set number of future sequential virtual memory address relative to the current virtual memory address. For example, the current virtual memory address may be X and the trigger condition could be three subsequent address requests. The pre-fetch transaction generator module 206 determines whether the TLB contains entries for X+1, X+2, and X+3. If not, the trigger condition is satisfied and one or more pre-fetch requests can be generated for the missing entries.

The pre-fetch transaction generator module 206 transmits the generated pre-fetch requests to the MMU 214. In certain implementations, pre-fetch transaction generator module 206 provides an indication of the transmission to control logic 210. Multiplexer circuit 208 controls whether the MMU 214 receives virtual memory access requests from the access request generator 202 or the pre-fetch transaction generator 206, allowing the pre-fetch transaction generator module 206 to temporarily act as a master without requiring complex arbitration with access request generator 202. For example, the access request generator 202 can operate without direct knowledge of the pre-fetch transaction generator 206.

As another example of a trigger condition, the pre-fetch transaction generator 206 can be configured to delay transmission of pre-fetch requests until the (AXI) interconnection/bus has been detected to enter an idle state. Limiting the pre-fetch requests to idle states/times may be useful for mitigating the adverse effect of the additional memory accesses from the pre-fetch requests. In certain embodiments, the responsiveness to the idle state can be disabled to allow the pre-fetch requests to be transmitted without regard to the idle state of the bus.

The MMU 214 receives the virtual memory pre-fetch requests and can then process the requests normally by checking the TBU 216, and the included TLB, for an entry corresponding to the virtual memory access request. Checking the TBU would normally result in a TLB miss, because the pre-fetch transaction generator 206 generates the virtual memory pre-fetch requests for entries that are not expected to be in the TLB. The TLB miss results in a page walk through the page table stored in a memory circuit that is accessible through the access response generator 226. Once the desired physical address information is found, the MMU 214 updates the TLB to include the corresponding entry.

According to various implementations, the MMU 214 does not distinguish between a virtual memory access request that originates from the access request generator 202 and a virtual memory pre-fetch access request that originates from the pre-fetch transaction generator module 206. Accordingly, the MMU 214 will next attempt to complete the virtual memory access request by sending a physical access request to the access response generator 226. Pre-fetch filter circuit 218 is configured to monitor the physical access requests from the MMU and to the access response generator 226. Upon detecting the presence of a physical access request that stems from a pre-fetch access request, filter/blocking module 220 can filter the physical access request to block it from reaching the access response generator 226. Particular implementations use an identifier (ID) within the physical access request in order to identify a physical access request that should be filtered. For example, process-unique IDs can accompany virtual memory (pre-fetch) access requests and the corresponding physical memory access requests. The pre-fetch transaction generator module 206 can be assigned a particular ID that is recognized by the pre-fetch filter circuit 218 so that corresponding physical access requests are filtered.

According to various implementations, the access response generator 226 generates a notification to the access request generator 202 when a physical access request is completed. The access response generator 226 does not generate a notification for a filtered physical access request. This can mean that neither the MMU nor the pre-fetch transaction generator module 206 will know when a pre-fetch operation has completed. Accordingly, response generator 222 can be configured to generate a completion notification for a filtered the pre-fetch. Multiplexer circuit 224 allows the response generator 222 to temporarily access the communication bus used to route the responses. Pre-fetch response filter 212 is configured to route the notification from the response generator, through the MMU and to the pre-fetch transaction generator module 206.

Figure 3:
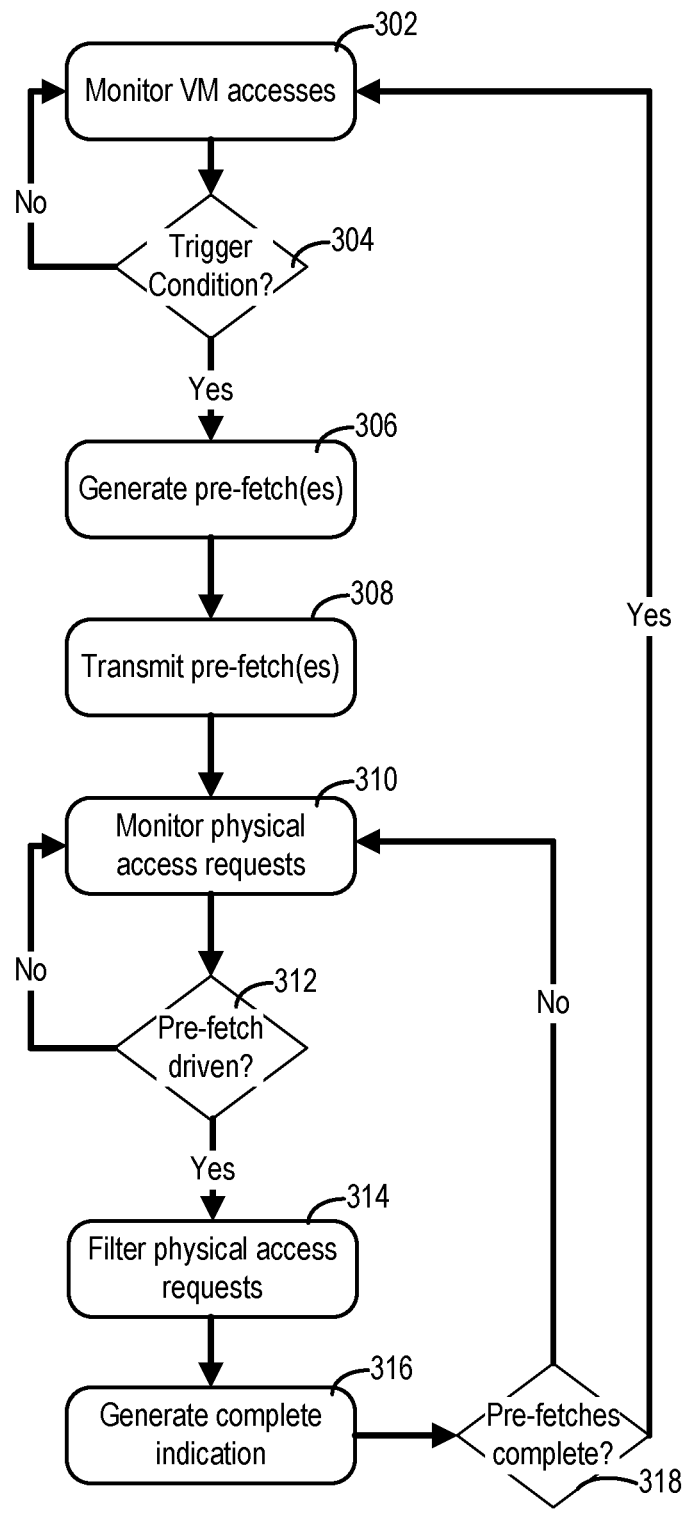
FIG. 3 is a flow diagram for generating virtual memory pre-fetch requests, consistent with implementations of the present disclosure.

FIG. 3 is a flow diagram for generating virtual memory pre-fetch requests, consistent with implementations of the present disclosure. A TLB pre-fetch circuit monitors virtual memory (VM) access requests, per block 302. For example, the TLB pre-fetch circuit can be connected to the address bus between a master and an MMU. As part of the monitoring effort, the TLB pre-fetch circuit thereby has access to the virtual memory address values for the virtual memory accesses.

According to various implementations, the TLB pre-fetch circuit uses the monitored information to determine when a trigger condition has been met, per block 304. If the trigger condition is not met, the TLB pre-fetch circuit continues to monitor the virtual memory accesses. If the trigger condition is met, the TLB pre-fetch circuit generates one or more virtual memory pre-fetch requests, per block 306. In some instances, multiple trigger conditions may be checked before the TLB pre-fetch circuit begins generating pre-fetch requests. For example, the TLB pre-fetch circuit can be configured with a first trigger event that corresponds to a depth of pre-fetch requests in the TLB (relative to an address for a current virtual memory request). A second trigger event might correspond to idle status of the data bus between a master and the MMU. Once both trigger events are satisfied, the TLB pre-fetch circuit begins generating pre-fetch(es). Various examples of trigger conditions are discussed in more detail herein.

The TLB pre-fetch circuit transmits the generated pre-fetch requests to the MMU, per block 308. In certain implementations, the transmission includes the use of a multiplexer circuit to allow the TLB pre-fetch circuit to temporarily function as the master in the memory system. As part of the pre-fetch requests, the TLB pre-fetch circuit can also include an indication that flags the pre-fetch requests. The flags can be used to determine that the particular virtual memory access is a pre-fetch that did not originate from the master. A particular example of such a flag is an ID that uniquely identifies the TLB pre-fetch circuit relative to process IDs used by the master.

A pre-fetch filter circuit monitors physical access requests that are on an interconnection bus between the MMU and the physical/main memory, per block 310. In a particular implementation, the pre-fetch filter circuit can monitor the physical access requests by retrieving, from each access request, a unique ID that identifies the source of the access request. The pre-fetch filter circuit can use this information to determine whether or not the access request is pre-fetch driven, per block 312. For example, the pre-fetch filter circuit looks for access requests that contain a unique ID that corresponds to the TLB pre-fetch circuit. If the access request is not pre-fetch driven, the pre-fetch filter circuit continues to monitor the physical access requests, per block 310. If the access request is pre-fetch driven, the pre-fetch filter circuit filters the corresponding access request, per block 314. For example, the pre-fetch filter circuit can include a comparator circuit that compares an ID received in an access requests to pre-stored unique ID that corresponds to the TLB pre-fetch circuit. In response to a match, the pre-fetch filter circuit filters the access request by, for example, disabling an output driver that forwards received access requests to the main memory.

The filtering of an access request means that the slave circuit providing access to main memory never receives the access request. Thus, the slave circuit will not generate a completion notification for the access request. According to certain implementations, the pre-fetch filter circuit is designed to generate such a completion indication or notification, per block 316. This completion notification can be provided to the TLB pre-fetch circuit, which can then determine whether or not additional pre-fetch requests are to be generated, per block 318. An example of the determination for block 318 is a comparison of the virtual memory address for the last pre-fetch with the desired depth of the TLB. For instance, if the last virtual memory address was for address X and the pre-fetch was for address X+2, the TLB pre-fetch circuit would generate additional pre-fetch requests if the depth was set to 3 or more.

Figure 4:
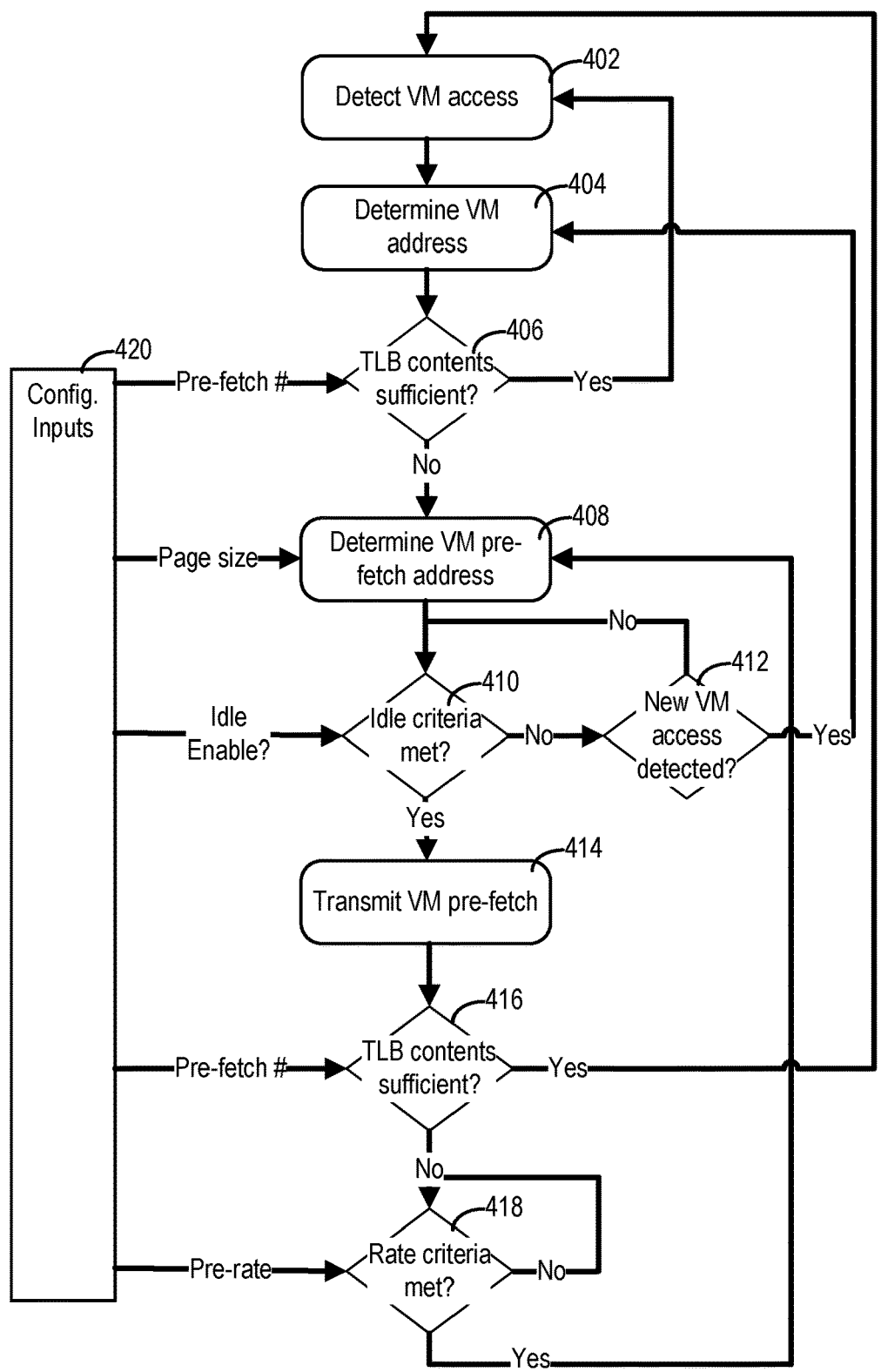
FIG. 4 is a flow diagram for configuring and using trigger conditions, consistent with implementations of the present disclosure.

FIG. 4 is a flow diagram for configuring and using trigger conditions, consistent with implementations of the present disclosure. The flow shows that various configuration inputs 420 can be used to set different trigger conditions and functionality of the TLB pre-fetch circuit. The flow begins when the TLB pre-fetch circuit detects a virtual memory access request, per block 402. The TLB pre-fetch circuit also determines the VM address for the virtual memory access request, per block 404. The TLB pre-fetch circuit can use the determined virtual memory address to decide whether or not the current contents of the TLB are sufficient, per block 406. According to certain implementations, the determination of block 406 can be based upon a pre-fetch number or depth. For instance, a pre-fetch depth of three would indicate that the TLB should contain three subsequent entries, relative to the determined virtual memory address. More particularly, if the determined virtual memory address is 'X,' the TLB pre-fetch circuit determines whether or not the TLB includes entries for X+1, X+2, and X+3, where X+1 represents the next sequential page in the virtual memory space from X.

If the contents are determined to be sufficient, the TLB pre-fetch circuit continues to monitor and detect virtual memory accesses, per block 402. If the contents are not sufficient, the TLB pre-fetch circuit determines the virtual memory pre-fetch address, per block 408. For instance, in the prior example of memory address 'X' and a depth of three, the TLB pre-fetch circuit generates an address for the lowest of X+1, X+2, and X+3. More particularly, the TLB might contain an entry for X+1, but not for X+2 or X+3. The TLB pre-fetch circuit therefore generates a pre-fetch address corresponding to X+2.

According to certain implementations, the TLB pre-fetch circuit can be configured to account for different virtual memory page sizes. The page size can determine the address size for each entry, because low-order bits of a virtual address do not affect the virtual-to-physical translation; the low-order bits are used as an offset within the desired page. The number of bits used for the offset is determined by the page size of the virtual memory space. For example, 4 KB pages have the 12 bits that are used for an offset. Non-limiting examples of page size settings are 4 KB, 16 KB, or 64 KB. Accordingly, the TLB pre-fetch circuit can use the page size configuration input 420 to determine the proper pre-fetch address, per block 408.

In some implementations, the TLB pre-fetch circuit is configurable to wait for the address bus to go idle before transmitting pre-fetch requests. Accordingly, the TLB pre-fetch circuit are configured to determine whether or not idle criteria (or trigger conditions) are met, per block 410. The first consideration can be whether or not the idle determination is enabled. If not enabled, the TLB pre-fetch circuit transmits the virtual memory pre-fetch request without regard for the idle status of the bus, per block 414. If the idle determination is enabled, the TLB pre-fetch circuit determines whether or not the bus is idle. If the bus is idle, the TLB pre-fetch circuit transmits the virtual memory pre-fetch request, per block 414. If the bus is not idle, the TLB pre-fetch circuit continues to wait for the bus to become idle. While waiting, a new virtual memory access could be received. Accordingly, the TLB pre-fetch circuit is configured to identify this occurrence, per block 412. Upon detection of a new access request, the TLB pre-fetch circuit repeats the flow beginning at block 404.

After the TLB pre-fetch circuit transmits the virtual memory pre-fetch request, the TLB pre-fetch circuit determines whether or not the resulting contents of the TLB are sufficient per block 416. As discussed herein, the particular depth can be a configurable amount. For example, in the above example with a depth of three, the TLB pre-fetch circuit determines whether or not the TLB contains X+1, X+2 and X+3. If the depth was four, the TLB pre-fetch circuit determines whether or not the TLB contains X+1, X+2, X+3, and X+4. If the TLB contents are sufficient, the TLB pre-fetch circuit does not generate additional pre-fetch requests until additional virtual memory accesses are detected, per block 402. If the TLB contents are not sufficient, then the TLB pre-fetch circuit can generate additional pre-fetch requests.

In certain implementations, the TLB pre-fetch circuit is configurable to limit the rate at which pre-fetch requests can be issued, per block 418. For example, the issue rate can be expressed as a total number of pre-fetch requests that can be outstanding at any given time. The length of time that is required to complete page walk can often be sufficient to generate and transmit multiple pre-fetch requests. Each additional pre-fetch request can consume more resources from the memory system. At the same time, the master may begin issuing additional virtual memory access requests while pre-fetch requests are still pending, and the additional requests may be delayed by outstanding pre-fetch requests. Limiting the total number of pre-fetch requests that can be pending at any given time may help to limit the amount of delay that can be introduced by the use of pre-fetch requests.

In some implementations, the TLB pre-fetch circuit is configured to limit pre-fetch requests to ever 'N' available address bus cycle, where one bus cycle corresponds to the timing between subsequent address requests issued on the address bus. Thus, for a value of four, the rate criteria will be met after four bus cycles have completed. The resulting delay can be useful for limiting the potential overhead caused by the issuance of the pre-fetch requests.

Consistent with some implementations, the TLB pre-fetch circuit is configured to generate the pre-fetch requests configured as read requests. The use of read requests can mitigate the risk of data corruption that might occur with a write request that is not properly filtered. For instance, a pre-fetch request that is a write request and that is allowed to reach the main memory could overwrite data in main memory.

Certain implementations allow for the use of pre-fetch requests configured as write requests. For instance, the memory system and its MMU is configured with separate write and read channels. The TLB pre-fetch circuit uses the bandwidth of each channel by formatting the pre-fetch requests as both writes and reads. For example, the TLB pre-fetch circuit may have the idle criteria enabled. With the idle criteria enabled, the TLB pre-fetch circuit sends the pre-fetch request on the first channel that enters an idle state. The pre-fetch filter circuit ensures that the write requests do not reach main memory. In particular implementations, a pre-fetch write request can be configured with all byte-enables de-asserted so that no data is written even if the request reaches main memory.

In some instances, the TLB pre-fetch circuit is configured to determine whether a virtual memory access request from a master is a read request or a write request. The TLB pre-fetch circuit formats any pre-fetch requests triggered by the virtual memory access request to match the determined read or write type. In this manner, pre-fetch requests will match the access type (read or write) of the underlying virtual memory access.

According to various implementations discussed herein, the TLB pre-fetch circuit is configured to use knowledge of the contents in the corresponding TLB, which is located in the MMU. Accordingly, the TLB pre-fetch circuit maintains a local copy of the TLB contents. The local copy does not need to include all of the TLB data or functionality. In particular, it can be sufficient for the local copy to include the virtual memory addresses for the current entries in the actual TLB (e.g., physical addresses do not need to be stored).

Various implementations are discussed in the context of the TLB pre-fetch circuit generating the virtual memory pre-fetch requests using sequential pages and corresponding addresses, the sequential addresses being relative to the address of the most recently received virtual memory access. Other implementations allow the TLB pre-fetch circuit to be configured to use non-sequential address generation algorithms to generate the pre-fetch addresses. For instance, a particular master may perform a function that often accesses memory every other virtual page. Accordingly, the TLB pre-fetch circuit can be configured to generate pre-fetch addresses for ever other virtual page. A similar adjustment can be made relative to determining the sufficiency of the TLB contents relative to a desired depth parameter. Other, more complex, address generation algorithms can also be used.

Figure 5:
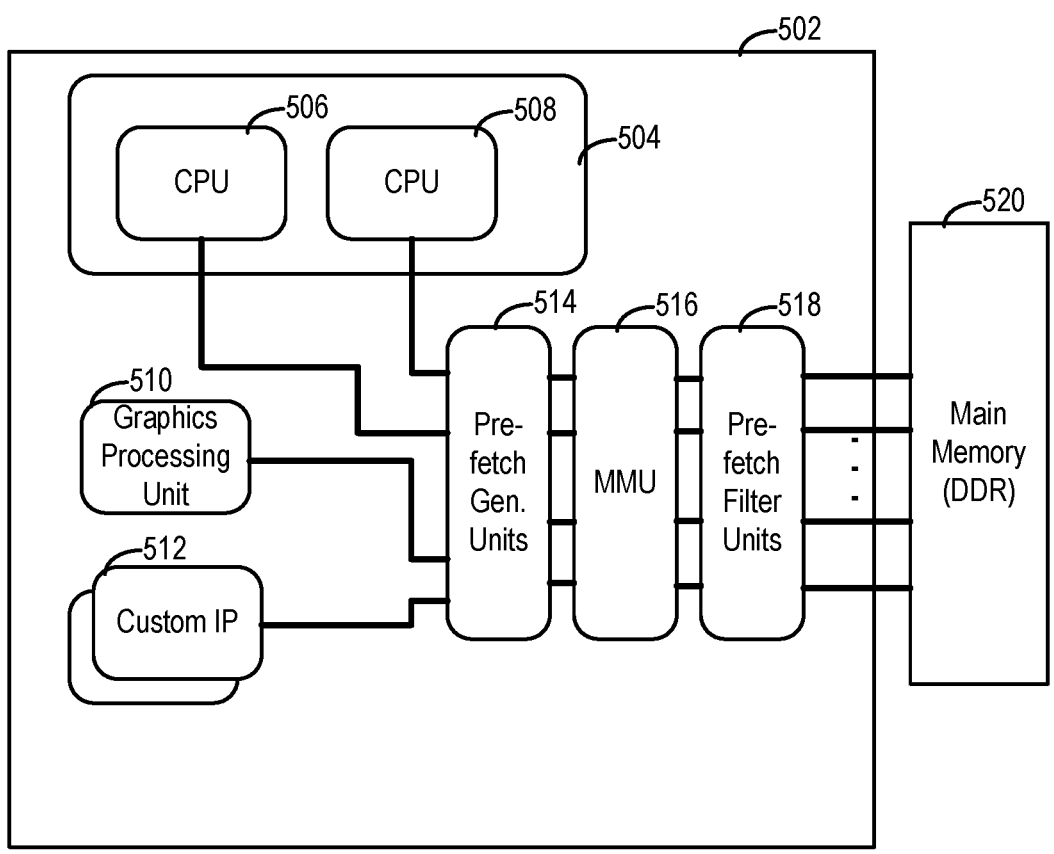
FIG. 5 shows an example of an integrated circuit (IC) chip that is configured to use virtual memory pre-fetch requests, consistent with implementations of the present disclosure.

FIG. 5 shows an example of an integrated circuit (IC) chip that is configured to use virtual memory pre-fetch requests, consistent with implementations of the present disclosure. The IC chip 502 includes multiple sources of virtual memory access requests (also referred to as masters in some interconnection solutions). The depicted examples include a microcontroller circuit 504 with one or more CPUs 506 and 508, a GPU 510, and customizable intellectual property (IP) cores 512. A few other non-limiting examples of access request sources include DSPs and DMA circuits that might be linked to input/output circuits, IP cores, or other circuits.

Although the various implementations discussed herein are not necessarily limited thereto, the IC chip can be a programmable IC chip. For example, the programmable IC could be a SoC that includes programmable resources (e.g., logic blocks and interconnects). The programmable resources could be a field programmable gate array logic (FPGA) that includes several different types of programmable logic blocks in the array. Though a programmable IC is described, those skilled in the art will recognize that the disclosed methods and systems may be applied to circuit designs that target application specific integrated circuits (ASICs) and are not limited to programmable integrated circuits (ICs).

The depicted IC chip includes a MMU 516 as well as pre-fetch generation circuits 514 and pre-fetch filter circuits 518, each of which can be consistent with one or more of the implementations discussed herein. The MMU controls access to main memory 520, which is depicted as being off-chip. The main memory 520 can also be located on chip.

One or more of the depicted components can be implemented in programmable logic. For instance, the shaded components 510, 512, 514, and 518 could be implemented within the programmable logic. The use of programmable logic can allow for more flexibility to the end user. For example, the pre-fetch generation circuits 514 and pre-fetch filter circuits 518 can be provided as part of a library of IP cores developed by the IC chip manufacturer. An end user can then decide whether to implement the IP cores for these circuits. As discussed herein, the MMU can be designed to operate substantially independent from the pre-fetch generation circuits 514 and pre-fetch filter circuits 518. For example, the MMU can handled all virtual memory requests the same, whether they are pre-fetch requests or from a dedicated master. Thus, the IP cores can be selectively added or removed from a design with little or no impact on the MMU configuration.

A programmable IC 502 can include a large number of different programmable tiles, which are not expressly depicted for sake of simplicity. A few examples of programmable tiles include multi-gigabit transceivers (MGTs), configurable logic blocks (CLBs), random access memory blocks (BRAMs), input/output blocks (IOBs), configuration and clocking logic (CONFIG/CLOCKS), digital signal processing blocks (DSPs), specialized input/output blocks (I/O), for example, clock ports, and other programmable logic such as digital clock managers, analog-to-digital converters, system monitoring logic, and so forth. FIG. 5 is intended to illustrate a non-limiting example of a (programmable) IC chip architecture.

For the various flow diagrams depicted herein, the particular orders of the blocks and associated functions are provided as examples. The ordering is not necessarily limiting and can be varied according to various implementations.

Those skilled in the art will appreciate that various alternative computing arrangements, including one or more processors and a memory arrangement configured with program code, would be suitable for hosting the processes and data structures that may carry out functions disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems that use RAM circuits. Other aspects and features will be apparent to those skilled in the art from consideration of the specification. The portions of the methods and system may be implemented as one or more processors configured to execute software, as an application specific integrated circuit (ASIC), or as a logic on a programmable logic device. Moreover, the various circuits identified herein may share hardware circuitry, such as use of a common computer processing unit or digital processing unit. It is intended that the specification and drawings be considered as examples only, with a true scope of the invention being indicated by the following claims.

What is claimed is:

1. A method for generating virtual memory pre-fetch requests for a virtual memory and a multiple port memory management unit (MMU) circuit, the method comprising:
   monitoring by a translation lookaside buffer (TLB) pre-fetch circuit, virtual memory access requests sent to a particular port of the MMU circuit;
   detecting satisfaction of at least one trigger condition that is based upon the virtual memory access requests;
   generating, in response to the satisfaction of the trigger condition, virtual memory pre-fetch requests by TLB pre-fetch circuit;
   transmitting the virtual memory pre-fetch requests to the MMU circuit using the particular port;
   in response to each virtual memory pre-fetch request, generating a first physical access request for a page table entry by the MMU circuit, storing the page table entry in a respective translation lookaside buffer associated with the particular port, and generating a second physical access request by the MMU circuit for a physical address corresponding to a virtual address of the virtual memory pre-fetch request;

monitoring physical access requests, including the first and second physical access requests from the MMU circuit, for physical addresses corresponding to the virtual memory pre-fetch requests; and filtering each second physical access request corresponding to one of the virtual memory pre-fetch requests.

2. The method of claim 1, further comprising generating a transaction completion indication for the filtered physical addresses and providing the transaction completion indication to the MMU circuit.

3. The method of claim 1, further comprising receiving an indication of a page size for the virtual memory and adjusting the at least one trigger condition in response to the indication.

4. The method of claim 3, further comprising receiving an indication of a number of virtual memory pre-fetch requests to generate and adjusting another trigger condition in response to the indication.

5. The method of claim 1, further comprising detecting an idle state for the particular port of the MMU circuit and wherein the transmitting the virtual memory pre-fetch requests to the MMU circuit using the particular port is in response to the detecting of the idle state.

6. The method of claim 5, further comprising disabling, in response to receiving a corresponding indication, the responsiveness to the detecting of the idle state.

7. The method of claim 1, further comprising receiving an indication of an issue rate for generating virtual memory pre-fetch requests and inserting, in response to the indication, a delay between the transmitting the virtual memory pre-fetch requests.

8. The method of claim 1, wherein the virtual memory pre-fetch requests are each read requests.

9. The method of claim 1, wherein the virtual memory pre-fetch requests include write requests.

10. A system comprising:
a memory management unit (MMU) circuit that includes multiple ports, each port configured to translate virtual memory addresses to physical memory addresses using a respective translation lookaside buffer (TLB);
at least one TLB pre-fetch circuit that, for a particular port of the multiple ports, is configured to:
monitor virtual memory access requests sent to the particular port of the MMU circuit;
detect, for the virtual memory access requests, satisfaction of at least one trigger condition;
generate, in response to the satisfaction of the at least one trigger condition, virtual memory pre-fetch requests; and
transmit the virtual memory pre-fetch requests to the MMU circuit using the particular port;
wherein, the MMU circuit is circuit is further configured to, in response to each virtual memory pre-fetch request, to:

generate a first physical access request for a page table entry,
store the page table entry in a respective translation lookaside buffer associated with the particular port, and
generate a second physical access request for a physical address corresponding to a virtual address of the virtual memory pre-fetch request; and
at least one TLB pre-fetch filter circuit that is configured to:
monitor physical access requests, including the first and second physical access requests from the MMU circuit, for physical access requests corresponding to the virtual memory pre-fetch requests; and
filter each second physical access request corresponding to one of the virtual memory pre-fetch requests.

11. The system of claim 10, wherein the at least one TLB pre-fetch filter circuit is further configured to generate a transaction completion indication for the filtered physical access request and to provide the transaction completion indication to the MMU circuit.

12. The system of claim 10, wherein the at least one TLB pre-fetch circuit is further configured to receive an indication of a page size for virtual memory of the system and to adjust the at least one trigger condition in response to the indication.

13. The system of claim 12, wherein the at least one TLB pre-fetch circuit is further configured to receive an indication of a number of virtual memory pre-fetch requests to generate and to adjust another trigger condition in response to the indication.

14. The system of claim 10, wherein the at least one TLB pre-fetch circuit is further configured to detect an idle state for the particular port and to transmit the virtual memory pre-fetch requests in response to detecting of the idle state.

15. The system of claim 14, wherein the at least one TLB pre-fetch circuit is further configured to disable, in response to receiving a corresponding indication, the responsiveness to detecting of the idle state.

16. The system of claim 10, wherein the at least one TLB pre-fetch circuit is further configured to receive an indication of an issue rate for generating virtual memory pre-fetch requests and to insert, in response to the indication, a delay between transmitting the virtual memory pre-fetch requests.

17. The system of claim 10, wherein the virtual memory pre-fetch requests are each read requests.

18. The system of claim 10, wherein the virtual memory pre-fetch requests include write requests.

19. The system of claim 10, wherein the least one TLB pre-fetch circuit is configured to determine whether the virtual memory access requests sent to the particular port of the MMU circuit are write or read requests and to configure virtual memory pre-fetch requests as write or read requests, respectively.

20. The system of claim 10, further comprising an integrated circuit chip that includes each of the MMU circuit, the at least one TLB pre-fetch circuit, and the at least one TLB pre-fetch filter circuit.

* * * * *